United States Patent [19]

Kuze

[11] Patent Number: 5,129,577
[45] Date of Patent: Jul. 14, 1992

[54] SEALING MEANS FOR A THERMOSTAT

[76] Inventor: Yoshikazu Kuze, 31-3, Higashimagome 1-chome, Ohta-ku, Tokyo, Japan

[21] Appl. No.: 608,379

[22] Filed: Nov. 2, 1990

[30] Foreign Application Priority Data

Nov. 4, 1989 [JP] Japan .................................. 1-286031
Dec. 11, 1989 [JP] Japan .................................. 1-318790

[51] Int. Cl.$^5$ .............................................. F01P 7/02
[52] U.S. Cl. .................................. 236/34.5; 251/335.3; 277/212 FB
[58] Field of Search ......................... 236/34, 34.5, 100; 251/335.3; 277/208, 212 FB, 212 R

[56] References Cited

U.S. PATENT DOCUMENTS

| | | | |
|---|---|---|---|
| 2,001,251 | 5/1935 | Irving | 351/335.3 X |
| 2,617,621 | 11/1952 | Hobbs | 251/335.3 X |
| 3,231,194 | 1/1966 | Kuze | 236/34.5 |
| 3,331,377 | 7/1967 | Castello | 251/335.3 X |
| 3,454,220 | 7/1969 | Bentz et al. | 236/34 |
| 3,774,881 | 11/1973 | Gregory | 251/335.3 |

Primary Examiner—William E. Tapolcai
Attorney, Agent, or Firm—Beveridge, DeGrandi

[57] ABSTRACT

A thermostat has a frame having a valve seat, a rod secured to the frame, a guide member slidably mounted on the rod, and a valve secured to the guide member. On the rod, atubular sealing member is slidably mounted. The sealing member has a tubular body, a base portion, a closed head portion, and a plurality of annular grooves or annular projections formed in an inner wall of the body. The base portion is secured to the guide member, and the head portion is engaged with an end of the rod.

1 Claim, 5 Drawing Sheets

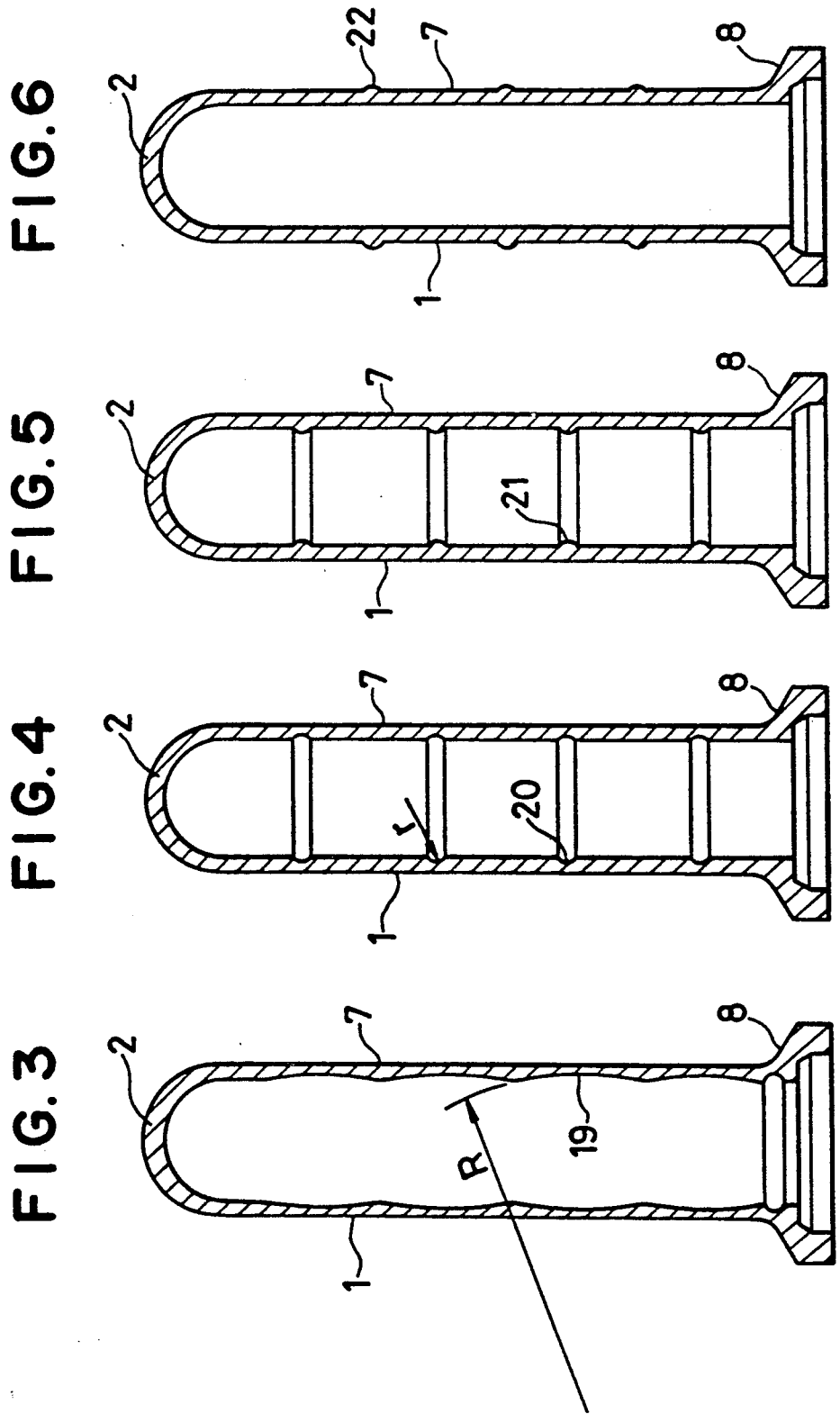

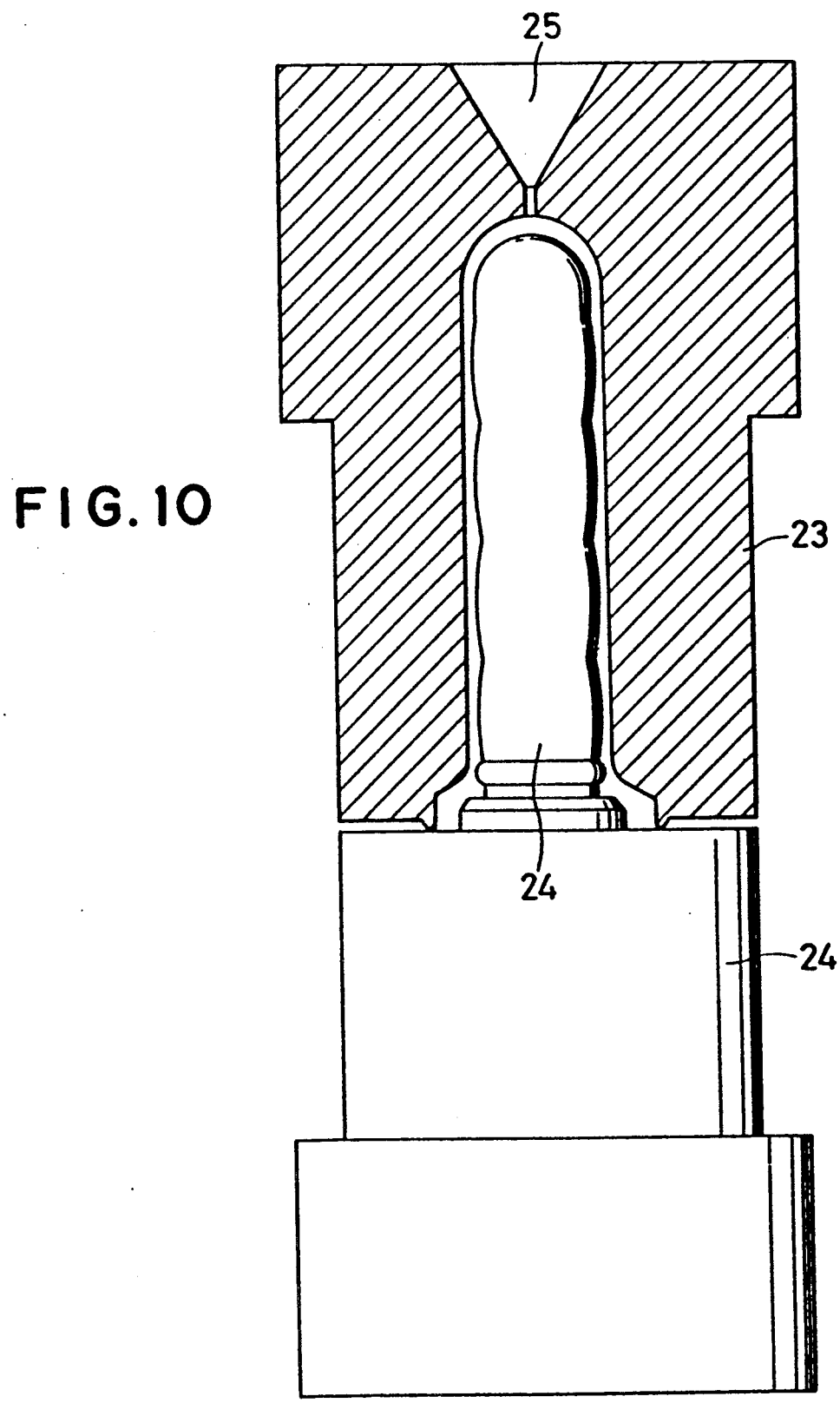

SEALING MEANS FOR A THERMOSTAT

CROSS-REFERENCE TO RELATED APPLICATION

This invention is disclosed in part in my co-pending application entitled Tubular Member For Sealing a Reciprocating Rod, Ser. No. 07/608,380, filed on Nov. 2, 1990.

BACKGROUND OF THE INVENTION

The present invention relates to a sealing means for a thermostat mounted on a motor vehicle, and more particularly to a tubular sealing member which can be automatically deformed in the form of a bellows when the tubular member is contracted.

The wax-pellet thermostat is used in a cooling system of the motor vehicle. When coolant temperature in the cooling system rises above a predetermined temperature, a valve in the thermostat opens to pass the coolant to a radiator, thereby lowering the temperature of the coolant. The valve is closed when the temperature drops. Consequently, a guide member mounting the valve reciprocates along a rod. In order to seal a sliding portion of the guide member, a dynamic seal such as a packing is provided. However, a conventional seal is liable to be deteriorated because of severe circumstances. More particularly, the coolant includes fine molding sands, fine particles of rusted iron, oil and other particles which form a sludge with antifreeze mixture.

SUMMARY OF THE INVENTION

An object of the present invention is to provide a sealing means having high durability.

Another object of the present invention is to provide a sealing means having a high sealing effect. A further object of the present invention is to provide a sealing means having a long stroke with a small size.

According to the present invention, there is provided a sealing means for a thermostat having a frame having a valve seat, a rod secured to the frame, a guide member slidably mounted on the rod, and a valve secured to the guide member. The sealing means comprises a tubular sealing member made of rubber, the sealing member having a tubular body, a base portion, a closed head portion, and a plurality of annular portions, the thickness of each annular portion being different from that of the tubular body, the tubular body being slidably mounted on the rod, the base portion being secured to the guide member of the thermostat, and the head portion being engaged with an end of the rod.

In an aspect of the invention, each of the annular portions is an annular groove formed in an inner wall of the tubular body.

In another aspect of the invention, each of the annular portions is an annular projecting rib formed on an inner wall or an outer periphery of the tubular body. The thinner portions of the tubular body are expanded to automatically form a bellows when the tubular sealing member is contracted. The tubular sealing member is extended to a straight tubular form. Thus the tubular member covers the entire sliding portion to protect it.

Since the tubular member is made into a straight tubular form, a very small tubular member can be easily manufactured by molding at a low cost.

These and other objects and features of the present invention will become more apparent from the following description with reference to the accompanying drawings.

BRIEF DESCRIPTION OF THE DRAWINGS

FIGS. 3 to 6 are sectional views showing tubular sealing members of various types which are used in the sealing means of the present invention;

FIG. 10 is a sectional view of a metal mold unit for molding the sealing member.

DETAILED DESCRIPTION OF THE PREFERRED EMBODIMENT

Figure 1:
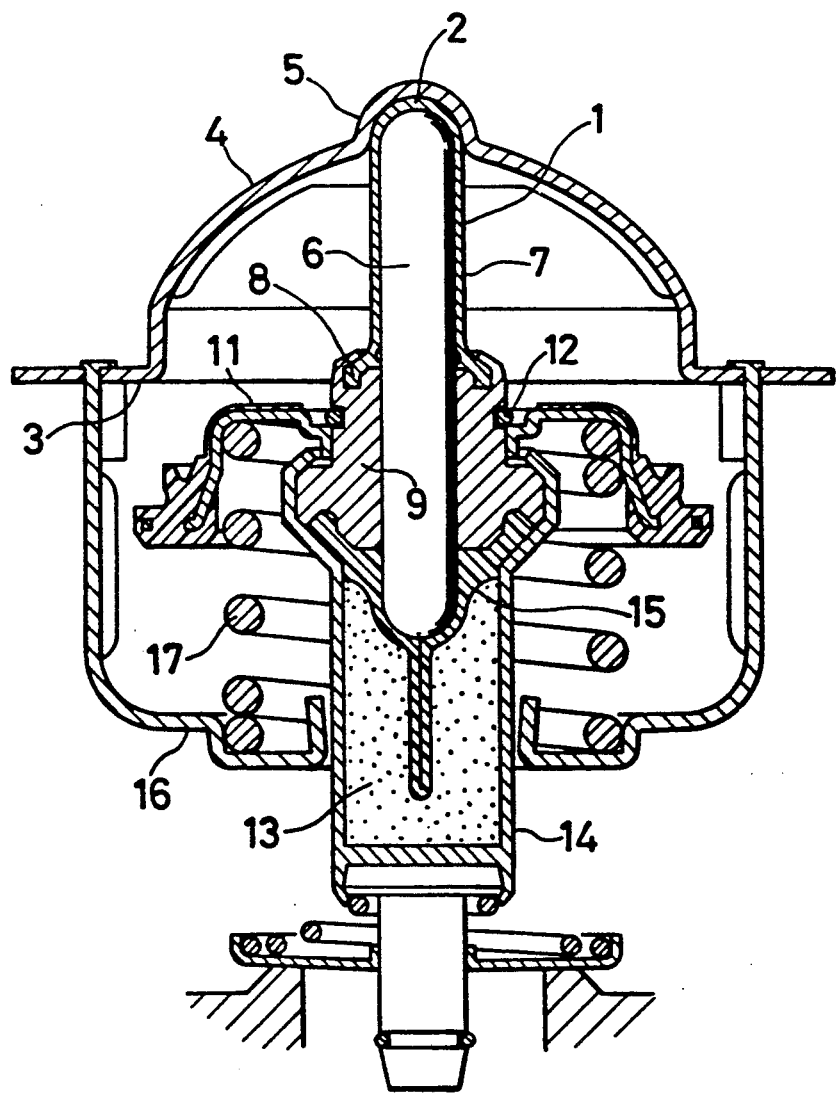
FIG. 1 is a sectional view of a wax-pellet thermostat having a sealing means according to the present invention in a fully opened state.
Figure 2:
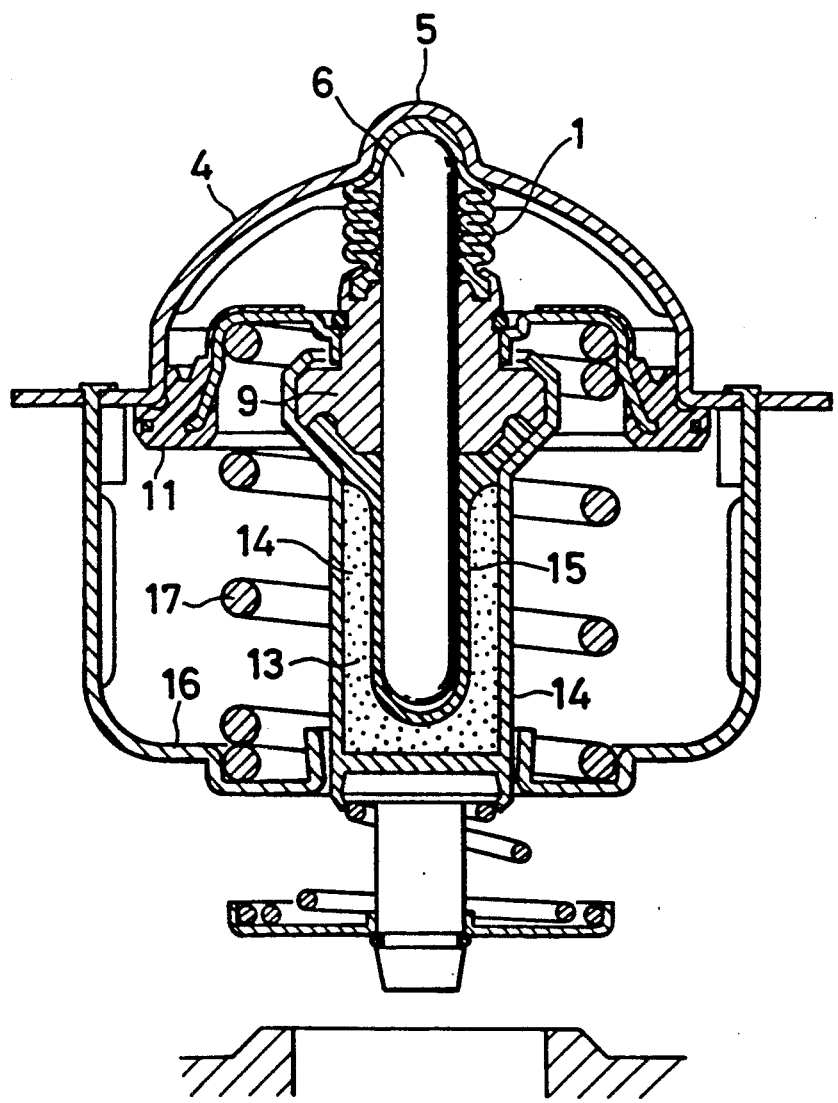
FIG. 2 is a sectional view of the thermostat in closed state.

Referring to FIGS. 1 and 2, the wax-pellet thermostat of the present invention has a thermostat frame comprising a first frame 4 and a second frame 16 secured to the first frame 4. The first frame 4 has a valve seat 3. The thermostat comprises a steel rod 6, a tubular sealing member 1 of rubber which is slidably mounted on the steel rod 6 and secured to the first frame 4 at a top portion 5, a guide member 9 slidably engaged with the rod 6, a primary valve 11 secured to the guide member 9, a heat conductive cylinder 14 secured to the guide member 9, a rubber diaphragm 15 secured to the guide member 9, and wax pellets 13 provided in the cylinder 14. A return coil spring 17 disposed surrounding the cylinder 14 is provided between the primary valve 11 and the bottom of the second frame 16. A snap ring 12 is engaged with the guide member 9 for securing the primary valve 11 to the guide member 9.

FIG. 2 shows the valve in the closed state. When the temperature of the coolant rises in excess of a predetermined temperature, the wax pellets 13 expand. This forces the diaphragm 15 against the steel rod 6. As the wax pellets 13 squeeze the diaphragm 15 around the rod 6, the wax pellets 13 overcome the coil spring 17 and the guide member 9 moves downward, thereby opening the primary valve 11 as shown in FIG. 1.

When the thermostat cools, the wax pellets 13 contract. Then, the coil spring 17 returns the valve 11 to the closed position as shown in FIG. 2. The tubular sealing member 1 is compressed into a bellows.

Referring to FIGS. 3 to 6 showing various types of the tubular sealing member 1 to which the present invention is applied, each of the tubular sealing members 1 is adapted to automatically form a bellows when compressed.

The tubular sealing member 1 comprises a tubular body 7 as shown in FIG. 3. The tubular body 7 has a base portion 8, a head portion 2 having a closed head and a plurality of annular grooves 19 circumferentially formed in an inner wall thereof. The annular groove 19 is formed to have a curvature in section having a large radius R.

The tubular sealing member 1 shown in FIG. 4 has a plurality of inner annular grooves 20 each of which has sectional curvature having a small radius r.

The sealing member 1 shown in FIG. 5 has a plurality of annular projecting ribs 21 circumferentially formed on the inner wall of the tubular body 7.

The sealing member 1 shown in FIG. 6 has a plurality of annular projecting ribs 22 formed on the outer periphery of the tubular body 7.

Figure 7:
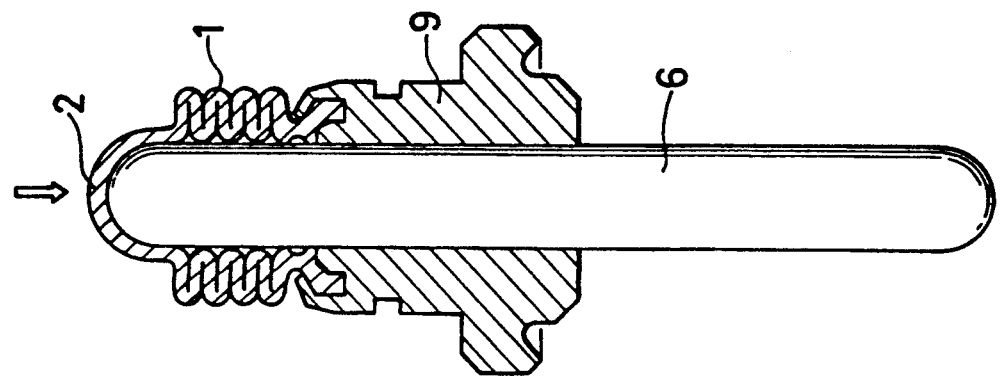
FIGS. 7 and 8 are sectional views showing a process for securing the sealing member to a guide member of the thermostat.
Figure 8:
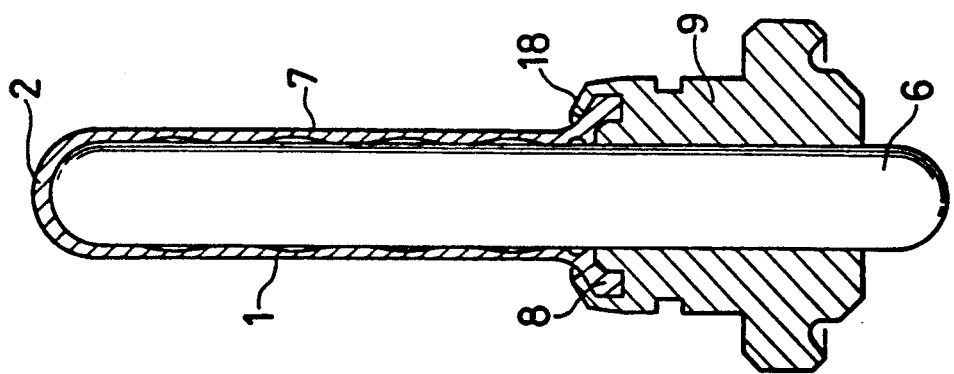

Referring to FIGS. 7 and 8, the tubular sealing member 1 is slidably mounted on the steel rod 6 at the tubular body 7 thereof. The inside of the closed head portion 2 of the tubular sealing member 1 is engaged with the top end of the steel rod 6 and the base portion 8 having a skirt portion is mounted in a seal pocket 10 provided on the guide member 9. An outer periphery 18 of the seal pocket 10 is bent at a predetermined hydraulic pressure so that the tubular sealing member 1 is secured to the guide guide member 9 with a sealing effect.

Figure 9:
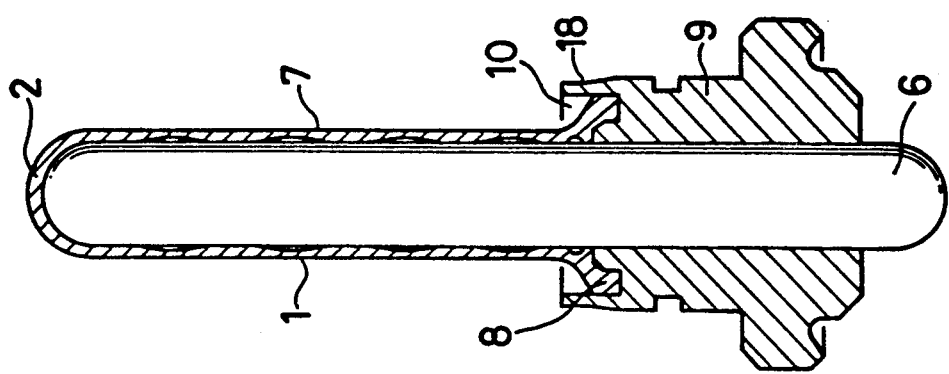
FIG. 9 is a sectional view showing operation of the sealing member.

When the guide member 9 moves upward along the steel rod 6 by the force of the spring 17, the tubular sealing member 1 is automatically shaped into a bellows as shown in FIG. 9.

FIG. 10 shows a metal mold unit for molding the tubular sealing member 1. A female mold 23 is mounted on a male mold 24, thereby forming a cavity therebetween. Melted rubber is poured from an inlet 25 into the cavity.

From the foregoing, it will be understood that the present invention provides a thermostat in which a tubular sealing member is mounted on the steel rod of the thermostat for sealing the steel rod. The sealing member prevents the guide member from introducing the coolant and foreign materials through the sliding portion between the steel rod and the guide member. Thus, overcool and overheat of the engine do not occur caused by the coolant entering the thermostat, thereby improving the thermal efficiency of the engine and hence reducing harmful exhaust gases. Furthermore engine trouble caused by overheating does not occur.

The tubular sealing member is compressed from the straight tubular form to the bellows, so that a large stroke can be obtained with a member having a small length. Thus the thermostat can be small in size.

Since the sealing member becomes a bellows when compressed, sealing effect between the steel rod and the guide member is improved.

The applicant conducted the following durability experiment and had the good result.

| | |
|---|---|
| Reciprocating stroke | 10 mm |
| Spring load | 11.5 kg |
| Cycle time | 6 seconds |
| (On time: 3 seconds, | |
| Off time: 3 seconds) | |
| Life | 310.000 cycles |

While the invention has been described in conjunction with preferred specific embodiment thereof, it will be understood that this description is intended to illustrate and not limit the scope of the invention, which is defined by the following claims.

What is claimed is:

1. A sealing means for a thermostat having a frame having a valve seat, a rod secured to the frame at an end thereof, a guide member slidably mounted on the rod, a valve secured to the guide member, and actuating means sensitive to heat for moving the guide member, comprising:

a tubular sealing member made of rubber;

the sealing member having a straight tubular form in a free condition, a base portion, a head portion and a plurality of annular portions, the cross sectional thickness of each annular portion in the radial direction being different from that of the tubular body;

the tubular body being slidably mounted on the rod, the base portion being secured to the rod to the guide member of the thermostat;

the head portion being secured to the rod at said end of the rod; and, the annular portions being so designed that the tubular body is contracted in the form of a bellows from the straight tubular form when the guide member is moved to the end of the rod.

* * * * *